United States Patent [19]

Shinohara

[11] Patent Number: 4,640,593
[45] Date of Patent: Feb. 3, 1987

[54] PROGRESSIVE MULTIFOCAL OPHTHALMIC LENSES

[75] Inventor: Toshihide Shinohara, Suwa, Japan

[73] Assignee: Seiko Epson Kabushiki Kaisha, Tokyo, Japan

[21] Appl. No.: 534,211

[22] Filed: Sep. 20, 1983

[30] Foreign Application Priority Data

Sep. 29, 1982 [JP] Japan .................. 57-170627

[51] Int. Cl.$^4$ .............................................. G02C 7/06
[52] U.S. Cl. ................................................... 351/169
[58] Field of Search ............... 351/169, 168, 170, 171, 351/172

[56] References Cited

U.S. PATENT DOCUMENTS

| | | | |
|---|---|---|---|
| 3,687,528 | 8/1972 | Maitenaz | 351/169 |
| 3,910,691 | 10/1975 | Maitenaz | 351/169 |
| 4,055,379 | 10/1977 | Winthrop | 351/169 |
| 4,056,311 | 11/1977 | Winthrop | 351/169 |
| 4,062,629 | 12/1977 | Winthrop | 351/169 |
| 4,315,673 | 2/1982 | Gulino et al. | 351/169 |
| 4,537,479 | 8/1985 | Shinohara et al. | 351/169 |

*Primary Examiner*—John K. Corbin
*Assistant Examiner*—Scott J. Sugarman
*Attorney, Agent, or Firm*—Blum, Kaplan, Friedman, Silberman & Beran

[57] ABSTRACT

A progressive multifocal ophthalmic lens having a refractive lens surface divided into a far vision viewing zone, an intermediate viewing zone and a near vision viewing zone and defining a substantially vertical principal meridian curve. The optical center of the far vision viewing zone is at the lower end of the principal meridian curve in the far vision viewing zone and an optical center of the near vision viewing zone is at the upper end of the principal meridian curve in the near vision viewing zone. The curvature of the principal meridian curve changes between the optical center of the far vision viewing zone and the optical center of the near vision viewing zone in accordance with a prescribed law to define the additional power of the lens. At each point on the principal meridian curve in at least one of the far vision viewing zone and near vision viewing zone, the difference between the curvature along the principal meridian curve and the curvature along the vertical direction with respect to the principal meridian curve at each point on the principal meridian curve is not zero in any part of the at least one zone.

20 Claims, 19 Drawing Figures

PROGRESSIVE MULTIFOCAL OPHTHALMIC LENSES

BACKGROUND OF THE INVENTION

The present invention is generally directed to ophthalmic lenses and, in particular, to progressive multifocal ophthalmic lenses which include a far vision viewing zone, a near vision viewing zone and an intermediate zone which smoothly blends the far vision viewing zone into the near vision viewing zone.

Each of the different viewing zones in progressive multifocal ophthalmic lenses are of different power for properly viewing objects at different distances. The refractive surface of such lenses are aspherical which inevitably causes a large amount of astigmatism and distortion. Accordingly, attempts have been made to design the refractive surface of such lenses in order to improve the characteristics thereof and reduce the astigmatism and distortion. U.S. Pat. Nos. 3,687,528, 3,910,691 and 4,056,311 disclose various constructions for progressive multifocal ophthalmic lenses. Moreover, the present inventor has also invented several previous constructions for progressive multifocal ophthalmic lenses which are disclosed in co-pending U.S. patent application Ser. No. 327,288, filed Dec. 3, 1981 now U.S. Pat. No. 4,580,883.

Lenses of the type described above are constructed to improve the curved lens surface in respective regions of the lens. However, zone of these lenses or the patents in which they are described recognize that it is important in designing lenses to consider the optical efficiency and appearance of the lens, that is, considering a base curve (a curve of a refractive surface in the far vision viewing zone on the basis of which the curved surfaces in other zones are determined) and the prescribed power. If the base curve and prescribed power are not in satisfying condition with respect to each other, the appearance of the lens is less than completely satisfactory and, also, in the case where a lens of strong power is prescribed, the optical efficiency of the lens is deteriorated.

The present invention is directed to improved progressive multifocal ophthalmic lenses wherein the problems discussed above are substantially overcome or eliminated.

SUMMARY OF THE INVENTION

Generally speaking, in accordance with the present invention, a progresssive multi-focal ophthalmic lens is provided. The lens includes a refractive surface divided into a far vision viewing zone, an intermediate vision viewing zone and a near vision viewing zone. The refractive surface defines a substantially vertical principal meridian curve. An optical center of the far vision viewing zone is at the lower end of the principal meridian curve in the far vision viewing zone and an optical center of the near vision viewing zone is at the upper end of the principal meridian curve in the near vision viewing zone. The curvature of the principal meridian curve changes between the optical center of the far vision viewing zone and the optical center of the near vision viewing zone in accordance with a prescribed law to define the additional power of the lens. At each point on the principal meridian curve in at least one of the far vision viewing zone and near vision viewing zone, the difference between the curvature along the principal meridian curve and the curvature along the vertical direction with respect to the principal meridian curve at each point on the principal meridian curve is not zero in any part of the at least one zone.

Accordingly, it is an object of the present invention to provide an improved progressive multifocal ophthalmic lens.

Another object of the present invention is to provide a progressive multifocal ophthalmic lens in which astigmatism and image distortion in the far and near vision viewing zones are reduced.

A further object of the present invention is to provide a progressive multifocal ophthalmic lens which is thinner and lighter than conventional lenses.

A still further object of the present invention is to provide an improved progressive multifocal ophthalmic lens in which vision is improved in the near and far vision viewing zones with respect to astigmatism and distortion.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 4A, 4B, 5A and 5B show the property of the conventional progressive multifocal lens in which the prescribed power of the lens and the base curve thereof is in a suitable condition and those in an unsuitable condition, respectively. FIGS. 4A and 5A illustrate the distribution of astigmatism and FIGS. 4B and 5B illustrate the focal power at each point on the principal meridian curve into the parallel and the vertical directions with respect to the principal meridian curve;

FIGS. 6A and 6B illustrate the change of the curvature at each point on the principal meridian curve into the parallel and vertical directions with respect to the principal meridian curve. FIG. 6A shows the change of curvature of the progressive multifocal lens according to the present invention and FIG. 6B shows the change of a conventional lens;

FIGS. 7A and 7B illustrate the change of curvature of the intersections vertical to the principal meridian curve in the far zone. FIG. 7A shows the change of the lens according to the present invention and FIG. 7B shows the change of a conventional lens.

DESCRIPTION OF THE PREFERRED EMBODIMENTS

Figure 1:
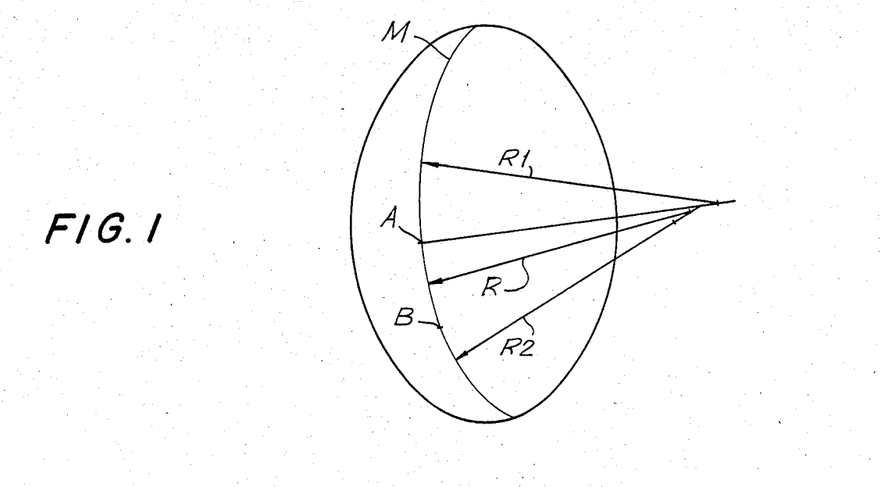
FIG. 1 is a perspective view showing the structure of a refractive surface of a progressive multifocal lens.

Reference is first made to FIG. 1 which is a perspective view of a convex side of a refractive lens surface showing the general structure of a progressive multifocal lens. Point A is the optical center of the far vision viewing zone (hereinafter referred to as the "far zone") and point B is the optical center of the near vision viewing zone (hereinafter referred to as the "near zone"). M is a principal meridian curve passing through the center of the lens. The radius of curvature of the principal meridian curve M is generally constant as R1 in the portion of the refractive surface above point A and as R2 in the portion of the refractive surface below point B and the radius R of curvature progressively changes R1 to R2 between points A and B. Since the reciprocal of the radius of curvature, that is, the curvature is proportional to the focal power on the refractive surface of the lens, the focal power increases progressively between point A and point B and is constant in each portion of the refractive surface above point A and below point B. Thus, the progressive multifocal lens has three zones, namely, a far zone above point A, a near zone below point B and an intermediate vision viewing zone (hereinafter referred to as an "intermediate zone") between point A and point B. The difference in focal power between the far zone and the near zone is referred to as additional power and is to compensate for the weakened ability of the wearer to control the focusing of his crystalline lenses.

The optical characteristics which are found in a progressive multifocal lens as compared to a typical single vision lens are astigmatism and distortion.

Figure 2:
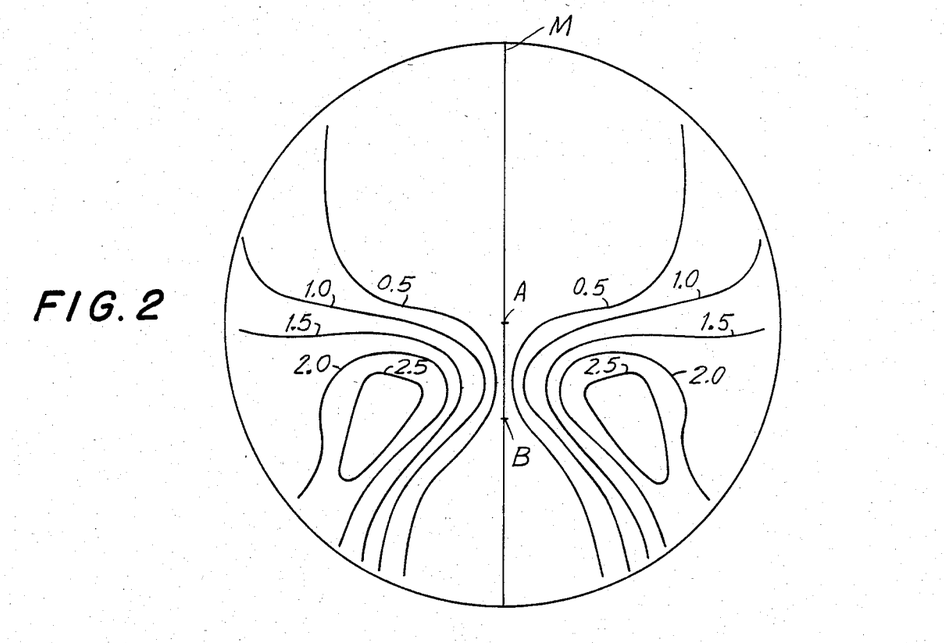
FIGS. 2 and 3 illustrate the distribution of astigmatism and the distortion of a progressive multifocal lens, respectively.

FIG. 2 illustrates the distribution of astigmatism with respect to the visual angle (the angle of the eye's rotation with reference to the eye's primary position when it is observing an object lying straight ahead); astigmatism is expressed in diopters. As shown in FIG. 2, the astigmatism is greater in lateral portions of the intermediate zone of a progressive multifocal lens and the image through these portions is dim. Generally speaking, as long as a lens has an astigmatism less than 0.5 diopters, astigmatism cannot be perceived and does not yield an uncomfortable view for a wearer of the lens. The portion of the lens where the astigmatism is less than 0.5 diopters is called the clear viewing zone. The lens is designed so that when fitted to a wearer's eye, the line of vision passes near point A when looking at a far point forward in a horizontal direction. Accordingly, an optical center axis (hereinafter referred to as an "optic axis") also passes near point A. That is, a near zone is far from an optic axis of the lens, which is one of the characteristics of a progressive multifocal lens. In the case of a typical single vision lens, the wearer looks through the portion of the lens near an optic axis for close work by moving his head as well as for normal usage. To be more concrete, when engaging in close work such as reading, the used area in a typical single vision lens is about 10° in terms of the visual angle while that in a progressive multifocal lens is 30° to 40°.

Figure 3:
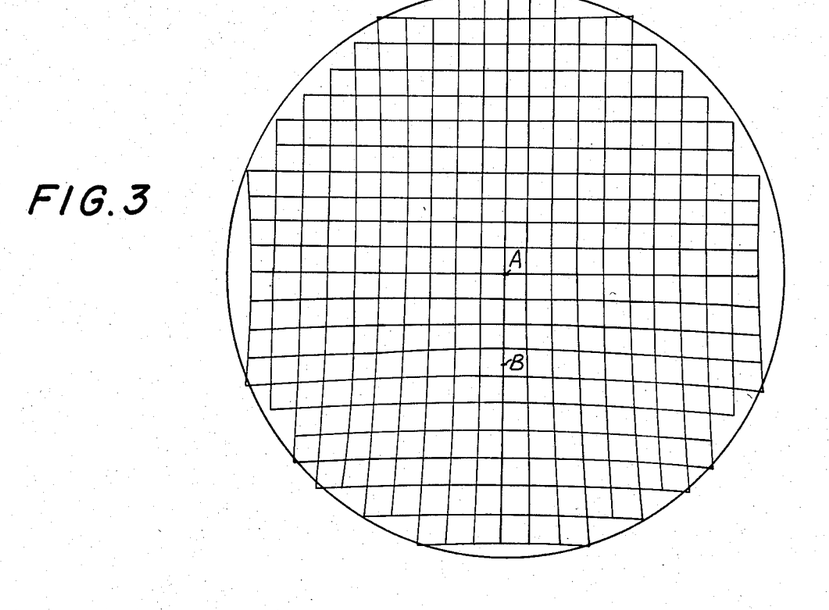

FIG. 3 illustrates distortion of the images of a square grid when viewed through a progressive multifocal lens whose far zone has a degree of 0 diopter. The image of the square grid is distorted in the peripheral portion of the intermediate zone. This distortion causes a shaking of the image when the wearer moves his head.

As mentioned above, a progressive multifocal lens creates some disadvantage of its own such as a limited clear viewing zone and shaking of the image. So it is important with a progressive multifocal lens to provide a clear viewing zone for a large area and to reduce the shaking of the image caused by the movement of a wearer's face.

The following is a description of the structure of the refractive surface of a conventional progressive multifocal lens. Generally, there are three types of progressive multifocal lens. In the first type, a surface of a far zone and a near zone is spherical and a clear viewing zone in each zones are kept large. In the second type, a surface of a far zone and a near zone is made to be aspherical so as to reduce the shaking of the image caused by the movement of a wearer's head. The third type is a combination of the first type and the second type.

In a lens of the first type, at each point on a principal meridian curve, the curvature along the principal meridian curve (hereinafter referred to as $\rho t$) is equal to the curvature in the direction of the vertical with respect to the principal meridian curve (hereinafter referred to as $\rho s$) since a surface of a far zone and a near zone is spherical. In a lens of the second type, the curvatures $\rho t$ and $\rho s$ are equal on the principal meridian curve. However, as the distance increases from the principal meridian curve, the curvature in the same direction as curvature $\rho s$ progressively increases in a far zone and gradually decreases in a near zone. In other words, a principal meridian curve is an umbilical curve. Also, in a lens of the third type, curvatures $\rho t$ and $\rho s$ are equal on the principal meridian curve.

The focal power at the principal meridian curve in a far zone (hereinafter referred to as a "base curve") depends on the power of a far zone and additional power. The power of a lens is determined mainly by the focal power of the convex surface of the lens and that of the concave surface thereof. The relation between the power and a base curve which is considered to be best in terms of various aberrations has been shown by many analyses represented by Chelning's ellipse. The best base curve is determined by the power of a lens in both cases of a progressive multifocal lens and a single vision lens. However, in the case of a progressive multifocal lens which includes a far zone and a near zone having convex surfaces of different curvatures and different powers (the amount of the difference is equal to that of additional power), a base curve should be determined so as to be best in terms of various aberrations in both zones. Nevertheless, the best base curve in the far zone and that in the near zone (the focal power of the near zone is the sum of the focal power of the far zone and the additional power) does not necessarily coincide because the required conditions for the two zones are different. Namely, in the far zone, it is required that a satisfactory vision with respect to various aberrations be obtained when looking a distant vision through the portion near the optic axis (less than 30° in terms of the visual angle), while in the near zone, it is required that a satisfactory vision be obtained when looking a close vision through the portion far from the optic axis (between 30° and 45° in terms of the visual angle). Additionally, in spite of the fact that the focal power of the convex surface of the near zone varies with additional power, a base curve is constant regardless of additional power for reasons of the manufacturing process of lenses.

When determining an optimal base curve, the fact that the smaller the base curve, the thinner the lens, should be taken into account. This fact is important in determining an optimal base curve of a strong plus lens which is apt to be thick, and is especially important in the case of a progressive multifocal lens which becomes thicker and heavier than a single vision lens because it is made to be large in size to make available use of a near zone having a large curvature.

FIGS. 4A, 4B, 5A and 5B illustrate examples of progressive multifocal lenses which the present inventor introduced in U.S. Patent Application Ser. No. 327,288, filed Dec. 3, 1981 now U.S. Pat. No. 4,580,883. Characteristics of the lenses shown by these Figs. are: (1) the refractive surface of the lens is divided into three zones, that is, a far zone, an intermediate zone and a near zone by a curve C1 including an optical center of the far zone and a curve C2 including an optical center of the near zone; and (2) an angle which is made by a plane including a principal meridian curve and a normal line to the surface on a point on the intersection of a plane which is parallel with the plane and the refractive surface is constant in each of the far zone and in the near zone, while in the intermediate zone, the above-mentioned angle changes according to the change of curvature of the principal meridian curve between the optical center of the far zone and that of the near zone. By designing the refractive surface of the lens in this manner, the changes in distribution of astigmatism and the amount of distortion are made to be progressive and smooth so that the wearer doesn't perceive the changes thereof.

Figure 4A:
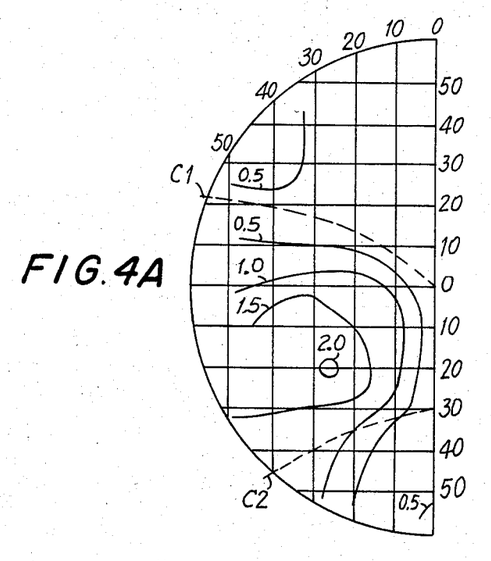
Figure 4B:
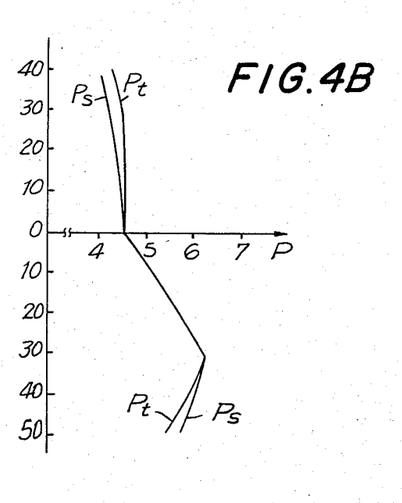
Figure 5A:
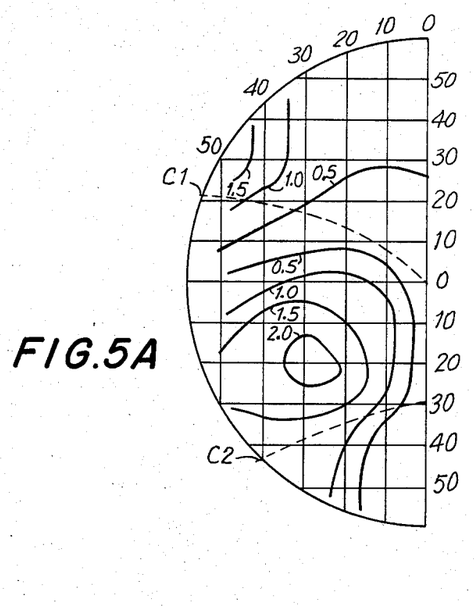
Figure 5B:
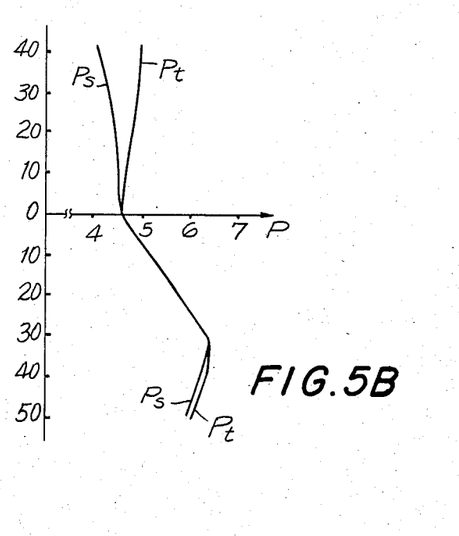

FIGS. 4A, 4B, 5A and 5B show the effect of a base curve on astigmatism. In these Figs., a base curve is 9.0 diopter (hereinafter referred to as "D") and 7.5D respectively. Except for the base curve, factors for determining the shape of the refractive surface such as a method of dividing the surface into a far, a near and an intermediate zone, the change of curvature of the intersection which is vertical to the principal meridian curve and the like are the same between these two lenses. In both lenses, the power of the far zone is +4.5D and additional power is 2.0D. In these Figs., FIGS. 4A and 5A are elevational views of the left half of a surface of a lens divided by the principal meridian curve illustrating the distribution of astigmatism and FIGS. 4B and 5B show the distribution of the focal power Pt along the principal meridian curve and the focal power Ps in the vertical direction with respect to the principal meridian curve on the principal meridian curve. Location on the lens surface is expressed in terms of the visual angle and an angle formed by the front plane of the lens frame and the wearer's face is 10°.

A comparison of FIGS. 4A, 4B, 5A and 5B give the following results. With respect to astigmatism, the lens with a base curve of 9.0D is apparently superior to the other one in the far zone, while the lens with a base curve of 7.5D is better than the other one at the point on the principal meridian curve in the near zone. The width of the clear viewing zone in the near zone is larger in the lens with a base curve of 9.0D than in the other lens. When the outer diameter of the lenses is 70 mm, the thickness of the lenses at the center part thereof is shown by the table below.

| Base curve (D) | thickness at the center point (mm) |
|---|---|
| 9.0 | 9.7 |
| 7.5 | 9.0 |

As shown by the table, with respect to the thickness and lightness of the lens, the lens with a base curve of 7.5D exceeds the other lens.

As mentioned above, the conventional progressive multi-focal lenses do not meet every requirement as excellent lenses.

The present invention as described hereinafter overcomes the aforementioned problems and disadvantages of progressive multifocal ophthalmic lenses.

Figure 6A:
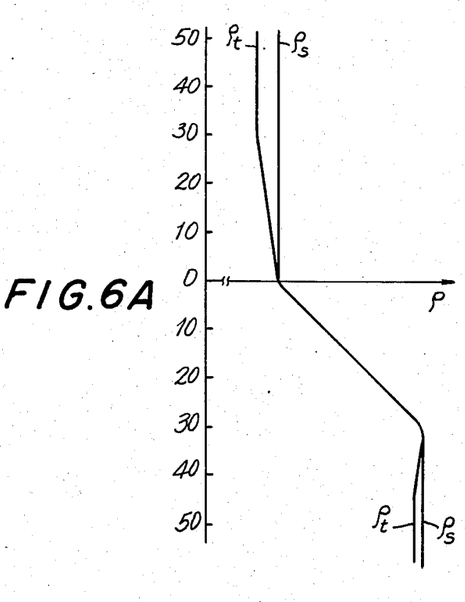
Figure 6B:
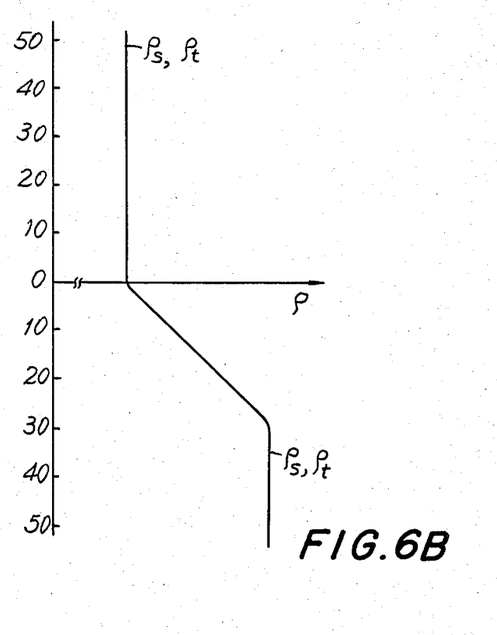

In the first embodiment of the present invention, the invention is applied to the lens of the type shown in FIGS. 5A and 5B. FIG. 6A illustrates the change of curvature of the principal meridian curve of the first embodiment of this invention and FIG. 6B illustrates that of the progressive multifocal lens shown in FIGS. 5A and 5B. In FIGS. 6A and 6B, $\rho t$ and $\rho s$ stand for curvature along the principal meridian curve and curvature in the vertical direction with respect to the principal meridian curve, respectively.

As mentioned above, the principal meridian curve of the conventional progressive multifocal lens is spherical or an umbilical curve and $\rho t = \rho s$. On the other hand, in the lens prepared in accordance with this invention, the relation between $\rho t$ and $\rho s$ changes. At the center points of the far zone and the near zone, $\rho t = \rho s$. As the position on the lens is more distant from the center points of both zones upward, downward and toward the peripheral part of the lens, $\rho t$ gradually decreases. In the portion above the point 30° upward in terms of the visual angle and the portion below the point 50° downward in terms of the visual angle, $\rho t$ stays constant. The difference between the two curvatures $\Delta \rho = \rho s - \rho t$ is 0 at the center points of the far zone and the near zone and increases gradually as the position on the lens is more distant from the center points of the far zone and the near zone upward and downward respectively finally to become constant. The increasing rate of curvature above the center of the far zone and that below the center of the near zone is 0.02D/mm and 0.01D/mm in terms of the focal power.

Figure 7A:
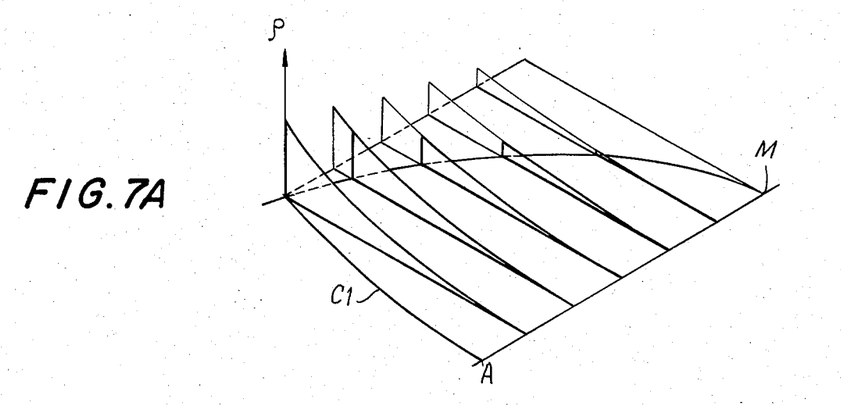
Figure 7B:
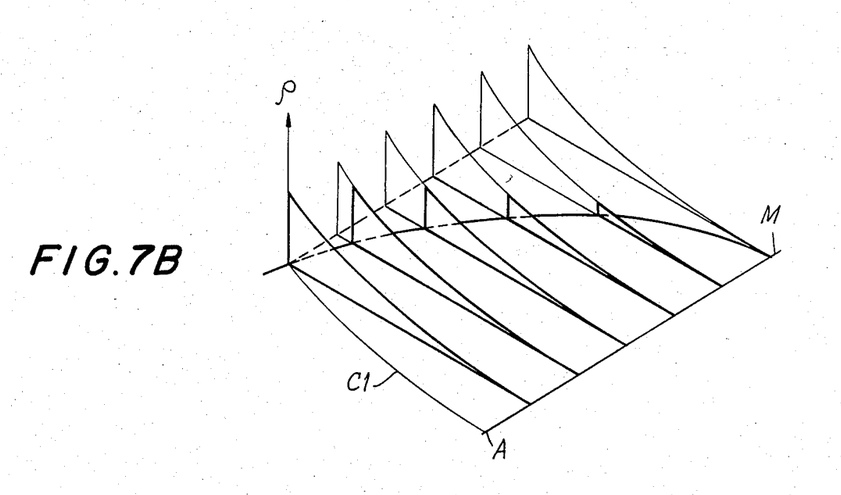

FIGS. 7A and 7B illustrate three-dimentionally the change of the curvature along the intersections which are vertical to the principal meridian curve (hereinafter referred to as the change of curvature into the horizontal direction) in the far zone of the lens. FIG. 7A show this in the lens according to this invention and FIG. 7B show this in a conventional lens. As is apparent from FIGS. 7A and 7B, in the conventional lens, the change of curvature into the horizontal direction from the point on the principal meridian curve toward the peripheral part of the lens is similar with respect to all intersections, while in the lens of this invention, the increasing rate of the curvature decreases as the intersection moves upward of the lens, that is, the intersection becomes spherical.

Figure 8A:
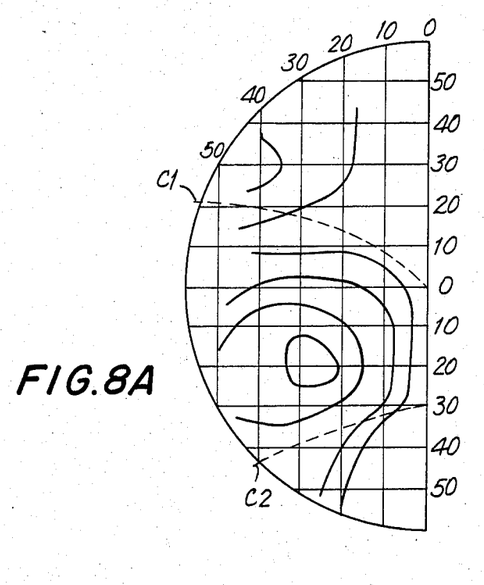
FIGS. 8A and 8B illustrate the distribution of the astigmatism and the focal power at each point along the principal meridian curve of a lens according to a first embodiment of the present invention.
Figure 8B:
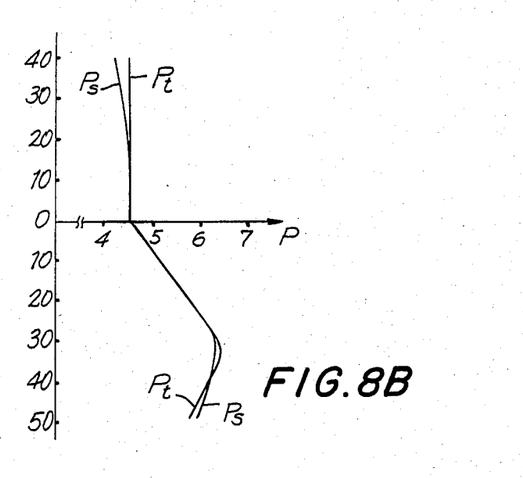

FIGS. 8A and 8B show the astigmatism property of the embodiment of this invention as described so far. FIGS. 8A and 8B, similar to FIGS. 5A and 5B, illustrate the distribution of astigmatism on the left semicircle of the lens and the focal power at each point on the principal meridian curve into the horizontal and vertical directions with respect to the principal meridian curve.

In the lens of FIGS. 8A and 8B, compared with that of FIGS 5A and 5B, the astigmatism is small in the far zone especially in the portion near the principal meridian curve and consequently a large clear viewing area is provided. Additionally, the width of the clear viewing zone in the near zone is larger in FIGS. 8A and 8B than in FIGS. 5A and 5B. This results is explained as follows.

It is supposed that the appearance of the astigmatism on the lens surface is caused by two factors that the refractive surface of the convex surface of the lens is aspherical (referred to as an aspherical surface factor) and which is due to a base curve (referred to as a base curve factor). An aspherical surface factor is caused because the curvature of each position on the convex refractive surface varies with the direction except for the case of the spherical surface where the difference of curvature of various position is 0. The magnitude of the aspherical surface factor is expressed by the difference between the maximum curvature and the minimum curvature at each point on the convex surface. Since the curvature is proportional to the focal power, the magnitude of the aspherical surface factor is otherwise expressed by the difference of the maximum and the minimum focal power, that is, by the astigmatism.

Figure 9A:
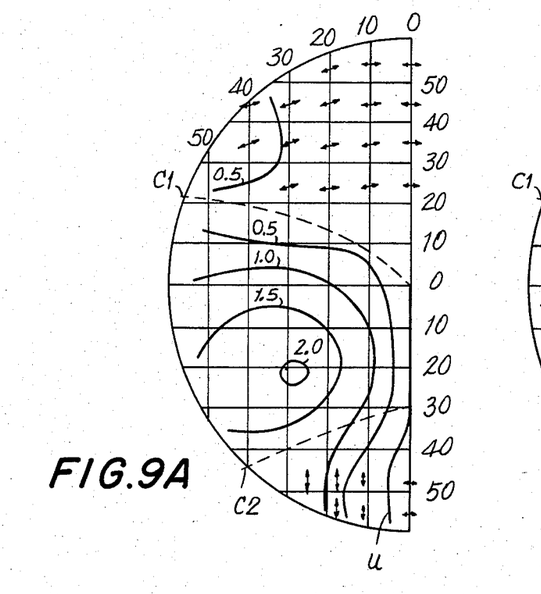
FIGS. 9a and 9B illustrate the astigmatism due to the aspherical surface of the convex side of a lens showing the difference between the lens according to the present invention and the conventional lens, respectively.
Figure 9B:
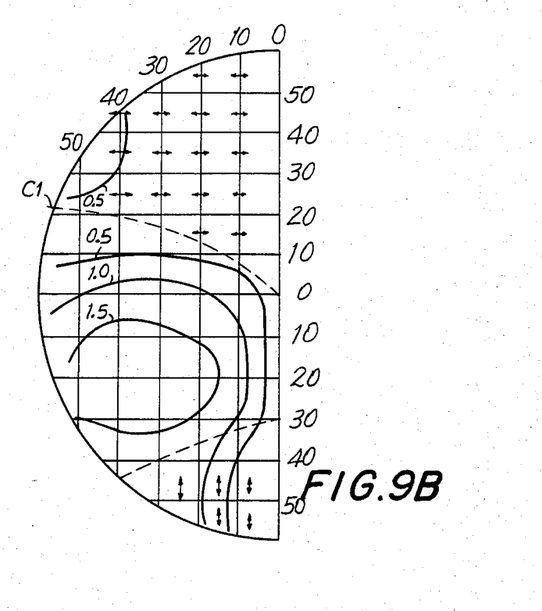

FIGS. 9A and 9B are elevational views of lenses showing the distribution of the amount of astigmatism in the lens according to this invention and the lens of conventional structure, respectively. Arrows in the drawings show the direction of the maximum focal power and the magnitude of the astigmatism at selected points. The other factor, a base curve factor, is caused by the relation of the undesirable combination of the power of the lens and a base curve which has already been referred to. Even if the convex surface of the lens is spherical, the base curve factor occurs in the portion far from the optic axis of the lens.

Figure 10:
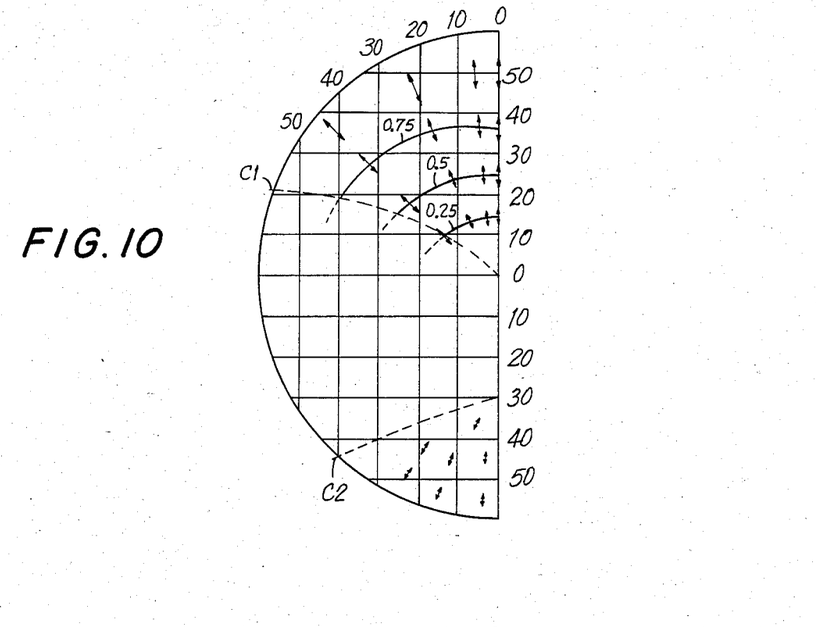
FIG. 10 illustrate the astigmatism due to the unsuitable condition of the base curve and the prescribed power of the lens.

FIG. 10 shows the base curve factor in the far zone and a near zone of a lens whose power is +4.5D and whose base curve is 7.5D. The way of expression in FIG. 10 is same as in FIGS. 9A and 9B. As shown by FIG. 10, in the far zone, the distribution of the astigmatism and the focal power is not rotary symmetrical with respect to the optic axis of the lens, while the optic axis coincides with the optical center A of the far zone. This is because the lens slants to some degree when the lens is fixed in the frame in practical use. The base curve factor in the near zone is very small.

The astigmatism of a lens is influenced by the combination of the abovementioned two factors. Here, the direction of the astigmatism shows a noticeable property. That is, at the point where the directions of the maximum focal power due to the aspherical surface factor (the direction of the aspherical surface factor) and that due to the base curve factor (the direction of the base curve factor) are vertical to each other, the astigmatism caused by the two factors negate each other, while at the point where the directions thereof are parallel to each other, the astigamtism caused by the two factors are added together.

The above noted principle explains the effect of this invention. According to this invention, as is apparent if FIGS. 9A, 9B and 10 are overlapped, the direction of the aspherical surface factor is vertical to that of the base curve factor in the upper portion of the far zone. Thus, the clear viewing zone in the far zone is provided for a large area as shown in FIGS. 8A and 8B according to this invention. In the near zone, the direction of the aspherical surface factor is vertical to that of the base curve factor in the portion adjacent to the principal meridian curve. As the position in the near zone is more distant from the principal meridian curve, the direction of the aspherical surface factor becomes umbilical on the curve u in FIG. 9A. Even though the direction of the astigmatism in the portion other than the curve u is almost the same as of the conventional lens, the magnitude thereof is very small and the area of the clear viewing zone is larger than the conventional.

As explained above, an object of this invention is to provide an improved progressive multifocal lens by constructing the convex refractive surface of the lens so as to prevent the astigmatism from being caused by unsuitability of the power of the lens and base curve thereof. The above mentioned convex surface of the lens consists of two constituents with reference to the principal meridian curve and with reference to the intersection which is vertical to the principal meridian curve, each of which is explained below.

When the power of a lens and a base curve thereof do not have a desirable relation, at each point along the principal meridian curve, there is a difference between the focal power along the principal meridian curve and that into the vertical direction with respect to the principal meridian curve. Thus, astigmatism appears. In order to prevent the astigmatism as above, the refractive surface of the lens along the principal meridian curve is designed so that the difference between curvature along the meridian curve and that into the vertical direction to the principal meridian curve at each point on the curve (that is, the difference of the focal power into the vertical and parallel directions to the principal meridian curve since the curvature and the focal power are proportional) is in the direction negative to the astigmatism.

The astigmatism caused by the undesirable relation between the power of the lens and the base curve thereof is of various types such as the astigmatism which simply increases as the position on the lens is more distant from the optic axis of the lens, the astigmatism which once increases and then decreases as the position on the lens is more distant from the optic axis of the lens, and so on. Therefore, the above noted difference of curvature into the vertical and parallel direction to the principal meridian curve (hereinafter referred to simply as the difference of curvature) at each point on the principal meridian curve must be determined according to the type of astigmatism. If the determination of the difference of curvature is done accurately, the astigmatism along the principal meridian curve is entirely eliminated. Considering the available area of the lens for spectacles, the difference of curvature $\Delta \rho$ along the principal meridian curve is provided in the aforementioned manner at least within the area between points about 15 mm at most apart from the center of the far zone and from the center of the near zone upward and downward respectively and expecially within the area between points about 5 mm apart from the center of each zone upward and downward respectively which is used most frequently. Within the above mentioned area, the astigmatism caused by the undesirable relation between the power of the lens and the base curve thereof generally increases rectilineally and the difference of curvature changes in accordance with the change of the astigmatism. Generally speaking, in a strong plus lens as the embodiment described before, at each point on the principal meridian curve, the focal power along the principal meridian curve Pt and that into the vertical direction with respect to the principal meridian curve Ps has a relation Pt>Ps. Consequently, at each corresponding point, the desired relation between the curvature along the principal meridian curve ρt and that into the vertical direction with respect to the principal meridian curve ρs is ρt<ρs.

If the optic axis of the lens is at the center of the far zone or adjacent thereto, the center of the far zone is supposed to be the cardinal point of the change of the difference of curvature along the principal meridian curve in the far zone. At the cardinal point, the difference of curvature Δρ=0. In the near zone of the lens, on the other hand, the center thereof is apart from the optic axis by ten or more mm. Accordingly, it is required that the difference of curvature Δρ is equivalent to 0.2 or less (Δρ≦0.2) in focal power at the center of the near zone selecting the desirable value with respect to the degree of unsuitability of the base curve.

When increasing the difference of curvature Δρ along the principal meridian curve, it is better to decrease the curvature along the principal meridian curve ρt while fixing the curvature into the vertical direction with respect to the principal meridian curve ρs at a constant value. By taking the above method, the average power of the lens along the principal meridian curve becomes close to the power at the optic axis of the lens.

The other constituent of the convex surface of the lens, namely, the intersections which are vertical to the principal meridian curve are designed in the following manner according to this invention. That is, in the far zone, the intersection is designed so that the curvature thereof increases as the point along the intersection is more distant from the principal meridian curve and the increasing rate of the curvature decreases as the intersection moves apart from the center of the far zone. In the near zone, the intersection is designed so that the curvature thereof decreases as the point along the intersection is more distant from the principal meridian curve and the decreasing rate of the curvature decreases as the intersection moves downward apart from the center of the near zone. By designing the near zone of the lens as mentioned above, the umbilical curve u shown in FIG. 9A moves toward the side portion of the lens as proceeding downward. Thus, the clear viewing zone in the near zone is enlarged.

Additionally, changing the curvature of intersections in the far zone or the near zone as mentioned above is advantageous with respect to reducing the distortion in various cases. For example, in the case where the far zone is designed as mentioned above when a strong plus lens is prescribed, so-called drum-like distortion in which the image is expanded laterally at the upper part of the lens (it is a characteristic of a plus lens) is reduced. As another example, the near zone of the lens is designed as mentioned above when a strong minus lens is prescribed, so-called barrel-like distortion in which the image becomes narrower at the lower part of the lens (it is a characteristic of a minus lens) is reduced.

Figure 11:
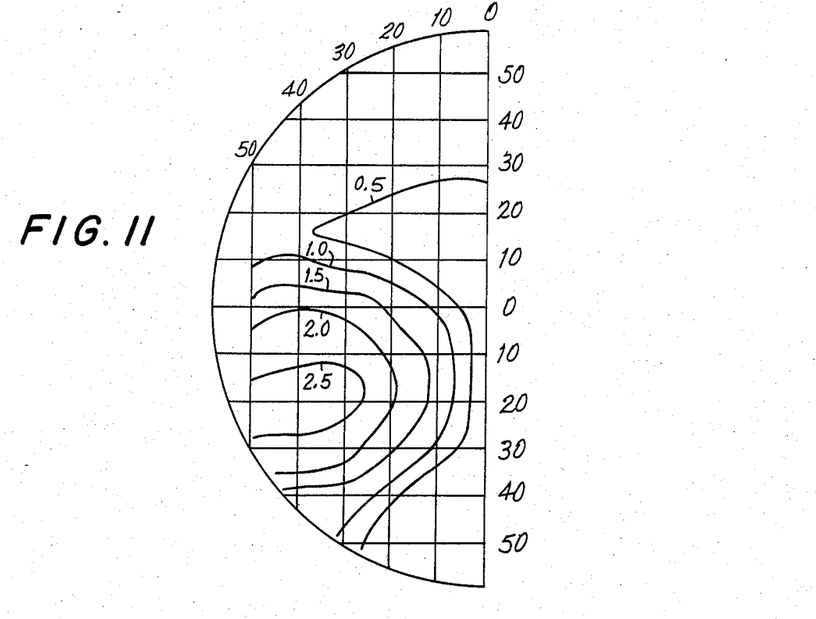
FIG. 11 illustrate the distribution of astigmatism of another conventional multifocal lens.

FIG. 11 shows another example of the lens which the present inventor introduced in the aforementioned U.S. patent application Ser. No. 327,288 now U.S. Pat. No. 4,580,883. In the lens shown in FIG. 11, both the far and the near zones have spherical surfaces. The base curve thereof is 7.5D and the prescribed power is +4.5D.

Figure 12:
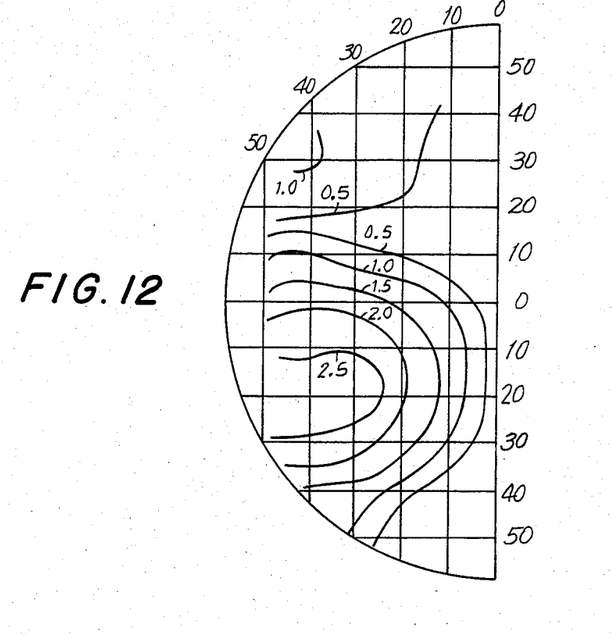
FIGS. 12 and 13 show the second and third embodiments of the present invention which is applied to the lens having the characteristics as shown in FIG. 11.

FIG. 12 illustrates a second embodiment according to the present invention in which the principle of this invention is applied to the lens of FIG. 11. In this embodiment, the curvature into the vertical and horizontal directions ρt and ρs along the principal meridian curve in the far zone is changed in the same manner as in the first embodiment described hereinbefore. The intersection which is normal to the principal meridian curve in the whole far zone is a spherical curve. Compared with the lens of FIG. 11, the astigmatism adjacent to the principal meridian curve in the far zone is largely reduced and thus the clear viewing zone is enlarged in this embodiment.

Figure 13:
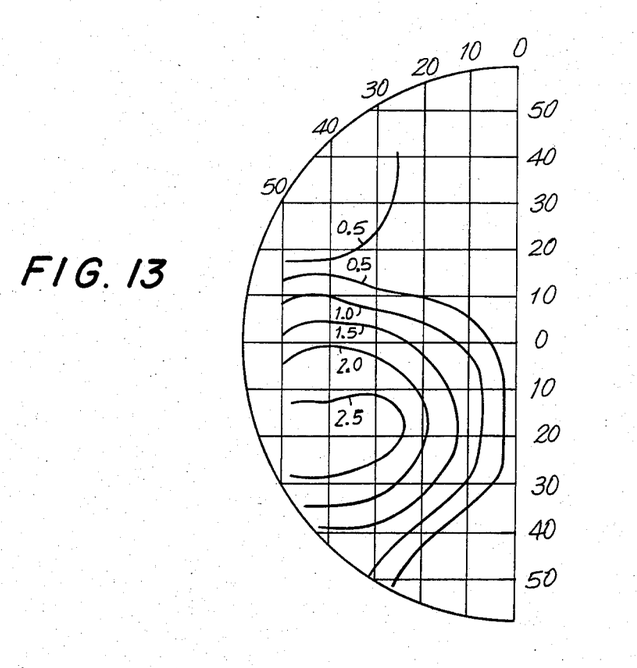

FIG. 13 illustrates a third embodiment of the present invention. In this embodiment, besides the modification added in the embodiment of FIG. 12, the intersection which is normal to the principal meridian curve is further modified in the following manner. In the far zone, the intersection normal to the principal meridian curve at the lowest end of the zone is spherical. Gradually as the intersection moves upward, it becomes aspherical in which a point on the intersection is farther from the principal meridian curve, the curvature at the point is less. The lens designed as mentioned above is provided with still a larger clear viewing zone than the lens shown by FIG. 12. The reason why the large clear viewing zone is provided may be easily understood from the explanation of the aspherical surface factor and the base curve factor of astigmatism described with reference to the first embodiment.

As described above, astigmatism of a lens is caused by various visual conditions which are peculiar to the progressive multifocal lens (for example, difference of the visual angle and the visual distance between when using the far zone and when using the near zone) and the inadequacy of the combination of the power and the base curve of the lens which occurs when the base curve is to be determined which is common in lenses which have different additional power respectively, or when the lens is to be made thinner, or the like.

According to this invention, the astigmatism is largely reduced and so is the image distortion, and thus a large clear viewing zone is provided. Especially in the case that the lens for correcting the strong hyperopia is prescribed, this invention provides a progressive multifocal lens which is visually satisfactory even with being made thinner and less in weight. It is also to be understood that the content of this invention can be applied either as a whole or as a part according to the case without decreasing the effect of this invention as described before.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A progressive multifocal ophthalmic lens comprising a refractive surface divided into a far vision viewing zone, an intermediate vision viewing zone and a near vision viewing zone, a substantially vertical principal meridian curve, an optical center of said far vision viewing zone being at the lower end of said principal meridian curve in said far vision viewing zone, and an optical center of said near vision viewing zone being at the upper end of said principal meridian curve in said near vision viewing zone, the curvature of said principal meridian curve changing between the optical center of said far vision viewing zone and the optical center of said near vision viewing zone in accordance with a prescribed law to define the additional power of said lens, the difference ($\Delta\rho$) between the curvature ($\rho t$) along said principal meridian curve and the curvature ($\rho s$) along the vertical direction with respect to said principal meridian curve at each point on said principal meridian curve, ($\Delta\rho = |\rho s - \rho t|$) is not zero along at least a portion of said principal meridian curve in at least one of said far vision viewing zone and said near vision viewing zone.

2. The ophthalmic lens as claimed in claim 1, wherein said difference of the curvatures $\Delta\rho$ progressively increases in at least one of the area between the optical center of said far vision viewing zone and a point spaced at least 5 mm upward therefrom and the area between the optical center of said near vision viewing zone and a point spaced at least 5 mm downward therefrom.

3. The ophthalmic lens as claimed in claim 1, wherein at the optical center of said far vision viewing zone, said curvature $\rho t$ and said curvature $\rho s$ are equal.

4. The ophthalmic lens as claimed in claim 2, wherein at the optical center of said far vision viewing zone, said curvature $\rho t$ and said curvature $\rho s$ are equal.

5. The ophthalmic lens as claimed in claim 1, wherein at the optical center of said near vision viewing zone, the difference $\Delta\rho$ between said curvature $\rho t$ and said curvature $\rho s$ is equivalent to 0.2 diopter or less in focal power.

6. The ophthalmic lens as claimed in claim 2, wherein at the optical center of said near vision viewing zone, the difference $\Delta\rho$ between said curvature $\rho t$ and said curvature $\rho s$ is equivalent to 0.2 diopter or less in focal power.

7. The ophthalmic lens as claimed in claim 2, wherein the difference $\Delta\rho$ between said curvature $\rho t$ and said curvature $\rho s$ increases rectilineally.

8. The ophthalmic lens as claimed in claim 2, wherein said curvature $\rho t$ gradually decreases as the distance from the optical center of said far vision viewing zone or the optical center of saiid near vision viewing zone increases with said curvature $\rho s$ being constant.

9. The ophthalmic lens as claimed in claim 2, wherein in said far vision viewing zone, the intersection vertical to said principal meridian curve has a curvature which increases as the lateral distance from said principal meridian curve increases along said intersection, the increasing rate of said curvature decreasing as said intersection moves apart from the optical center of said far vision viewing zone.

10. The ophthalmic lens as claimed in claim 2, wherein in said near vision viewing zone, the intersection vertical to said principal meridian curve has a curvature which decreases as the lateral distance from said principal meridian curve increases, the decreasing rate of said curvature decreases as said intersection moves apart from the optical center of said near vision viewing zone.

11. The ophthalmic lens as claimed in claim 2, wherein said refractive surface is divided into the far vision viewing zone and the intermediate vision viewing zone by a first curve C1 which includes the optical center of said far vision viewing zone and is divided into the intermediate vision viewing zone and the near vision viewing zone by a second curve C2 which includes the optical center of said near vision viewing zone, said intermediate vision viewing zone having a refractive surface wherein an angle formed by a line normal to the surface on each point of the intersection of the refractive surface with an arbitrary plane in parallel with the plane including the principal meridian curve and a plane including the principal meridian curve changes in the same manner as the change of the focal power along said principal meridian curve between the optical center of said far vision viewing zone and the optical center of said near vision viewing zone.

12. The ophthalmic lens as claimed in claim 7, wherein said refractive surface is divided into the far vision viewing zone and the intermediate vision viewing zone by a first curve C1 which includes the optical center of said far vision viewing zone and is divided into the intermediate vision viewing zone and the near vision viewing zone by a second curve C2 which includes the optical center of said near vision viewing zone, said intermediate vision viewing zone having a refractive surface wherein an angle formed by a line normal to the surface on each point of the intersection of the refractive surface with an arbitrary plane in parallel with the plane including the principal meridian curve and a plane including the principal meridian curve changes in the same manner as the change of the focal power along said principal meridian curve between the optical center of said far vision viewing zone and the optical center of said near vision viewing zone.

13. The ophthalmic lens as claimed in claim 8, wherein said refractive surface is divided into the far vision viewing zone and the intermediate vision viewing zone by a first curve C1 which includes the optical center of said far vision viewing zone and is divided into the intermediate vision viewing zone and the near vision viewing zone by a second curve C2 which includes the optical center of said near vision viewing zone, said intermediate vision viewing zone having a refractive surface wherein an angle formed by a line normal to the surface on each point of the intersection of the refractive surface with an arbitrary plane in parallel with the plane including the principal meridian curve and a plane including the principal meridian curve changes in the same manner as the change of the focal power along said principal meridian curve between the optical center of said far vision viewing zone and the optical center of said near vision viewing zone.

14. The ophthalmic lens as claimed in claim 2, wherein in said far vision viewing zone, the intersection which is vertical to said principal meridian curve is spherical.

15. The ophthalmic lens as claimed in claim 9, wherein in said far vision viewing zone, the intersection which is vertical to said principal meridian curve is spherical.

16. The ophthalmic lens as claimed in claim 1, wherein in said near vision viewing zone, the intersection which is vertical to said principal meridian curve is spherical.

17. The ophthalmic lens as claimed in claim 8, wherein in said near vision viewing zone, the intersection which is vertical to said principal meridian curve is spherical.

18. The ophthalmic lens as claimed in claim 9, wherein in said near vision viewing zone, the intersection which is vertical to said principal meridian curve is spherical.

19. The ophthalmic lens as claimed in claim 2, wherein in said far vision viewing zone, the intersection which is vertical to said principal meridian curve is spherical at the lower end of said far vision viewing zone and as said intersection moves upward in said zone, gradually changes into a curve whose curvature decreases as the lateral distance along said intersection from said principal meridian curve increases.

20. The ophthalmic lens as claimed in claim 9, wherein in said far vision viewing zone, the intersection which is vertical to said principal meridian curve is spherical at the lower end of said far vision viewing zone and as said intersection moves upward in said zone, gradually changes into a curve whose curvature decreases as the lateral distance along said intersection from said principal meridian curve increases.

* * * * *